(12) United States Patent
Selivansky

(10) Patent No.: US 7,045,209 B1
(45) Date of Patent: May 16, 2006

(54) SYNTHETIC FIBERS AND CEMENTITIOUS SYSTEMS INCLUDING SAME

(76) Inventor: Dror Selivansky, 65 Hantke St, Haifa (IL) 34608

( * ) Notice: Subject to any disclaimer, the term of this patent is extended or adjusted under 35 U.S.C. 154(b) by 0 days.

(21) Appl. No.: 09/958,320

(22) PCT Filed: Mar. 28, 2000

(86) PCT No.: PCT/US00/08168

§ 371 (c)(1),
(2), (4) Date: Oct. 9, 2001

(87) PCT Pub. No.: WO00/60150

PCT Pub. Date: Oct. 12, 2000

(51) Int. Cl.
*D02G 3/00* (2006.01)
*B32B 27/36* (2006.01)

(52) U.S. Cl. .................. 428/359; 428/394; 428/395
(58) Field of Classification Search ........... 428/375, 428/394, 395

See application file for complete search history.

(56) References Cited

U.S. PATENT DOCUMENTS

| | | | | |
|---|---|---|---|---|
| 35,972 A | * | 7/1862 | Cuculo et al. ............. 112/142 |
| 3,600,269 A | * | 8/1971 | Daniels et al. ............. 442/169 |
| 3,645,961 A | * | 2/1972 | Goldfein .................... 524/5 |
| 3,987,139 A | * | 10/1976 | Kozlowski et al. ......... 264/141 |
| 4,483,727 A | * | 11/1984 | Eickman et al. ............ 156/181 |
| 4,524,101 A | * | 6/1985 | Eickman et al. ......... 428/294.7 |
| 4,608,089 A | * | 8/1986 | Gale et al. ................... 524/8 |
| 5,399,195 A | * | 3/1995 | Hansen et al. ............. 106/711 |
| 5,405,696 A | * | 4/1995 | Cuculo et al. ............. 428/364 |
| 5,589,265 A | | 12/1996 | Neuert et al. |
| 5,855,663 A | | 1/1999 | Takano et al. |
| 5,897,928 A | | 4/1999 | Sanders et al. |
| 5,989,713 A | | 11/1999 | Naaman |
| 6,001,476 A | * | 12/1999 | Selivansky ................. 428/395 |
| 6,331,265 B1 | * | 12/2001 | Dupire et al. ............. 264/289.3 |

FOREIGN PATENT DOCUMENTS

WO          WO 83/00324          3/1983

* cited by examiner

*Primary Examiner*—J. M. Gray
(74) *Attorney, Agent, or Firm*—Hamre, Schumann, Mueller & Larson, P.C.

(57) ABSTRACT

The present invention discloses novel fibers for use as secondary reinforcement materials in cementitious composites, which fibers are effective in preventing cracking far better than prior art fibers. Also disclosed are methods of producing the fibers and methods for producing cementitious composite containing the fibers.

5 Claims, No Drawings

SYNTHETIC FIBERS AND CEMENTITIOUS SYSTEMS INCLUDING SAME

FIELD AND BACKGROUND OF THE INVENTION

The present invention relates to specific fibers suited for use as secondary reinforcement materials of cementitious matrices in cementitious composites and, more particularly, to acrylic fibers, melt spun synthetic fibers and precursor low orientation nylon fibers for use as secondary reinforcement materials in cementitious composites. The invention further relates to methods of manufacturing of such fibers via wet spinning of acrylic fibers and melt spinning of nylon and polypropylene fibers and to methods of production of the synthetic fibers reinforced cementitious composites.

More particularly, the present invention relates to improvement of the efficiency of short cut acrylic fibers for reinforcement of cementitious composites via adjustment of their friction and surface tension characteristics to obtain superior fibers dispersion in a cementitious matrix and greater reinforcement and crack arresting efficiency. The present invention further relates specifically to short cut melt spun synthetic fibers with improved efficiency for reinforcement of cementitious composites as a result of adjustment of their friction and surface tension characteristics to obtain superior fibers dispersion in the cementitious matrix and greater reinforcement and crack arresting efficiency. The present invention also specifically relates to precursor nylon fibers having a low degrees of crystallinity and orientation, low tenacity and modulus and high elongation characteristics and to upgraded precursor low orientation nylon fibers with improved efficiency for reinforcement of cementitious composites as a result of adjustment of their friction and surface tension characteristics to obtain superior fibers dispersion in the cementitious matrix and greater reinforcement and crack arresting efficiency.

As is well known in the art, cementitious composites, such as concrete, are prone to self-induced cracking, as such composites are brittle by nature. Self-induced cracks readily propagate through concrete under relatively low stresses. Thus, concrete fails in tension by progressive crack development.

The concrete's actual low tensile strength is explained by the presence of flaws (microcracks and cracks) that propagate into bigger cracks under tension. To increase the concrete durability it is, therefore, important to minimize the presence of microcracks and cracks that are distributed therein, which weakens the concrete and reduces its durability.

When a mix of concrete, or any other mix of a cementitious composite, is placed (e.g., poured, molded, layered, sprayed, etc.), the solids, e.g., aggregates, fines and cement, therein begin to settle downward due to gravity. As the solids sink, water is displaced and forced to the surface as bleed-water. Plastic shrinkage cracking of the concrete occurs when the rate of water evaporation exceeds the rate of water displacement. Shrinkage stresses associated with early volume change account for the majority of all non-structural cracks in concrete. As mentioned above, these cracks, which are formed while the concrete mix settles, affect the strength and durability of the concrete during service. Therefore, in the common practice, concrete products are watered and cooled while hardening. However, as watering concrete products while hardening does not completely eliminate microcracks and cracks formation and calls for special care, the search for concrete additives which reduce cracks formation has begun.

The use of nylon fibers in the reinforcement of concrete is set forth in U.S. Pat. No. 3,645,961. This patent discloses the use of discrete fibers to form a blast resistance concrete. Other related publications include U.S. Pat. Nos. 5,456,752; 5,399,195; 4,693,749; 4,902,347; and SU Pat. No. 1,479,618.

The presence of nylon fibers in a concrete mix alter the process of solids settlement and water bleeding, and therefore reduce the internal tensile stresses that lead to plastic shrinkage cracking during the early volume changes of the concrete while hardening. The stress-induced microcracks that begin to form are bridged and intersected by the millions of evenly distributed fibers present in the cementitious matrix, and cracks propagation is therefore halted.

Thus, nylon fibers assist in the prevention of microcracks during settling of concrete, which microcracks form flaws which, long after settling and during service, tend to develop into bigger cracks and fractions, which weaken the concrete and reduce its durability. Nevertheless, it is important to ensure that the fibers, which constitute part of the total volume of the cementitious matrix of the concrete, will not be deteriorated during service, since the loss of internal volume strength and substance will weaken the whole concrete matrix. Thus, the requirements from nylon fibers used in concrete reinforcement are (i) efficiency in reducing microcracks formation during settling and (ii) high durability, i.e., prolonged service before deteriorating.

A substantial growth in the use of technical nylon fibers for concrete and cement reinforcement has taken place since the first trials in using nylon fibers for concrete reinforcement. Both nylon 6.6 (e.g., Du Pont Type 663 and Type 665, both are distributed by Kapejo Inc.) and nylon 6 (e.g., Alliedsignal Caprolan-RC, distributed by Nycon Inc.) prepared having technical nylon properties, are used in the art of concrete production as typical concrete secondary reinforcing fibers, aimed at combating the cracking of the concrete during the early plastic stages of its settling. The term "secondary reinforcement" is commonly used in the art of concrete production to indicate a reinforcement directed at prevention or reducing cracks associated with concrete settling.

U.S. Pat. No. 6,001,476 teaches production and use of upgraded nylon fibers for secondary reinforcement of concrete and reinforced cementitious composites including the fibers. Teachings of this patent focus on a method of upgrading the strength and durability of nylon fibers, typically textile nylon fibers, to render the fibers suitable for use in secondary reinforcement of a cementitious matrix of cementitious composites, such as concrete. This prior art patent does not teach the use of low orientation precursor nylon or of acrylic fibers.

Similarly absent from the teachings of this patent is the concept of increasing the friction between fibers and the cementitious matrix as a means of improving the reinforcement properties of the fibers. However, according to the mechanical behavior models for fiber reinforced concrete, the fibers discontinuously distributed in the cement system contribute to its load carrying capacity via load transformation to the fibers by shear deformation at the fiber/matrix interface. Therefore, following basic composite materials rules of mixture, the extensional strength and stiffness of the system increase as the fibers ultimate strength and modulus values increase. Thus, the greater the fiber strength, better the load supporting capacity and the longer the maximum possible length of stress supporting fibers in the matrix. The overall effect is therefore an increased tensile strength of the system. Accordingly, typical fibers for cement systems reinforcement are of the high strength type (e.g., steel, glass, asbestos, etc.). For the same reason, synthetic fibers that have been used for reinforcement of cementitious systems (e.g., Nylon such as "Nycon RC"—characterized by modulus of 5,170 Mpa, and tenacity of 896 Mpa, Polypropylene such as "Fibrin 23" characterized by modulus of 3,500 Mpa, and tenacity of 370 Mpa, and Polacrylonitrile such as "Dolanit 10" characterized by modulus of 19,000 Mpa, and tenacity of 1,030 Mpa) against plastic shrinkage cracking that take place within the setting period of the cement, are typically designed to have higher modulus and tensile strength relative to standard textile fibers.

The failure in cementitious systems is typically initiated by tensile fracture of the matrix that yields cracks propagating throughout the system. The role of the reinforcing fibers is in crack arresting and fracture toughening.

According to recent studies (Y. Geng and C. K. Y. Leung (1996) "Microstructural Study of Fiber/Mortar Interfaces During Fiber Debonding and Pull-out", J. Mater. Sci. 31:1285–1294 and (1997) "Fiber Reinforced Concrete"— reported by ACI Committee 544, American Concrete Institute, Ch 4, ACI 544 IR pg 39–57), the pull-out of fibers at the crack planes is the dominant factor in the reinforcement mechanism, because of the easy debonding of synthetic fibers in cementitious systems and their lower interfacial cohesion relative to the primary reinforcing, such as steel, glass and asbestos fibers.

This means that the fiber distribution in the matrix is an important parameter—controlling the required content in the matrix for crack reduction since the inter—fiber spacing contributes to the crack arresting efficiency (R. F. Zollo (1997) "Fiber reinforced concrete: an overview after thirty years of development", Seminar 24–62 Abredeen's world of concrete, pages 12–41). Accordingly, adjusting fiber/cementitious system and interfiber frictions offers the possibility of developing new fibers for secondary reinforcement of concrete from materials typically considered unsuitable according to prior art teachings.

U.S. Pat. No. 5,989,713 teaches fiber cross-sectional geometries that increase the surface area that is available for bonding with the cementitious matrix. The greater surface area per unit weight of reinforcing fibers increases their bonding strength and the efficiency of stress transformation from the matrix to the fibers. A greater fraction of the ultimate fiber strength is thereby utilized for load carrying and crack bridging prior to debonding and pull-out of the fibers from the matrix. Teachings of this patent do not include changing the modulus of the fibers to achieve this effect nor do they include increasing dispersability of the fiber within the system during mixing.

However, in practice the pull-out stresses on the fibers are much lower than their ultimate tensile strength and are controlled by the frictional forces between the fibers and the cementitious system matrix. Therefore the fiber's high strength and stiffness requirements that are generally deemed necessary in reinforcement of hardened concrete by strong fibers (i.e., steel, glass and asbestos) are actually not necessary in the case of secondary reinforcement by synthetic fibers.

Since the fiber to aggregate coefficient of friction is of the same nature as the standard fiber-to-metal (f/m) coefficient of friction f/m may be employed as a parameter to quantify a fiber's frictional interaction with the cementitious matrix.

The fiber/cementitious system frictional forces also determine the extent of fibers mixing and distribution within the cementitious system. Greater frictional forces overcome the interfiber cohesion and spread the fibers faster in the matrix during the mixing stage of the fibers in the fresh cement slurry. Accordingly, for effective mixing of the fibers in the cementitious system, fiber with surface properties which create high f/m coefficients of friction while keeping low fiber-to-fiber (f/f) coefficients of friction and interfilament cohesiveness are desirable.

Use of nylon, acrylic and polyvinyl alcohol fibers is taught by Goldfine's U.S. Pat. No. 3,645,961 in order to meet these criteria, however this patent does not teach any lubrication or surface treatment in order to improve surface properties of fiber.

Techniques for improvement of fibers mixability in the concrete by premoisturizing are taught by WO83/00324 but these teachings are limited to olefinic fibers.

Pretreatment procedures for polyolefin fibers, including polypropylene fibers in particular, for cementitious system reinforcement have been reported in the patent literature (e.g., U.S. Pat. No. 5,399,195). This patent teaches procedures for increasing the hydrophilic nature of the hydrophobic olefinic fibers and enhancing their dispersability and compatibility with the cementitious matrix. Procedures taught by this patent do not change the frictional characteristics of the fibers.

There is thus a widely recognized need for, and it would be highly advantageous to have, specific fibers suited for use as secondary reinforcement materials in cementitious composites, methods for producing the fibers, and cementitious composites containing the fibers devoid of the above limitations.

SUMMARY OF THE INVENTION

According to one aspect of the present invention there is provided a stack of fiber staples for reinforcement of a cementitious matrix such as concrete. The stack comprises acrylic fibers coated with a substance which increases the fiber-to-metal coefficient of friction to an average level greater than 0.550, while simultaneously decreasing the fiber-to-fiber coefficient of friction to an average level less than 0.500.

According to another aspect of the present invention there is provided a method of manufacturing staples of acrylic fibers for reinforcement of a cementitious matrix such as concrete. The method comprises the steps of: (a) wet spinning a standard acrylic dope of at least 5%, but less than 35% (by weight) acrylic polymer, in a solvent to produce spun fibers and (b) cutting the spun fibers into staples.

According to yet another aspect of the present invention there is provided a cementitious composite. The cementitious composite comprises a hardened cementitious matrix. The matrix includes staples of acrylic fibers for reinforcement, wherein the fibers are coated with a substance which increases the fiber-to-metal coefficient of friction to an average level greater than 0.550, while simultaneously decreasing the fiber-to-fiber coefficient of friction to an average level less than 0.500.

According to still another aspect of the present invention there is provided a method of manufacturing a reinforced hardened cementitious composite. The method comprises the steps of: (a) providing components for forming a cementitious matrix including a cementitious substance, water and staples of acrylic fibers for reinforcement; (b) mixing the components until the fibers become well dispersed therein;

and (c) hardening the matrix. According to this aspect, the acrylic fibers are coated with a substance which increases the fiber-to-metal coefficient of friction to an average level greater than 0.550, while simultaneously decreasing the fiber-to-fiber coefficient of friction to an average level less than 0.500.

According to an additional aspect of the present invention there is provided a stack of fiber staples for reinforcement of a cementitious matrix such as concrete. The stack comprises low orientation precursor nylon fibers characterized by an average birefringence value greater than 0.0350, but less than 0.0440, an average modulus greater than 10 gram/denier, but less than 25 gram/denier, an average tenacity greater than 2.5 gram/denier, but less than 3.4 gram/denier, and an average elongation capacity greater than 46%, but less than 100%.

According to yet an additional aspect of the present invention there is provided a method of upgrading low orientation precursor nylon fibers to render them more suitable for use in reinforcing a cementitious matrix. The method comprises the steps of: (a) providing a stack of fiber staples including low orientation precursor nylon fibers characterized by an average birefringence value greater than 0.0350, but less than 0.0440, an average modulus greater than 10 gram/denier, but less than 25 gram/denier, an average tenacity greater than 2.5 gram/denier, but less than 3.4 gram/denier, and an average elongation capacity greater than 46%, but less than 100%; (b) impregnating the fibers with a chemical for obtaining impregnated nylon fibers, the chemical is selected so as to upgrade the fibers to increase chemical stability thereof; and (c) drying the low orientation precursor nylon fibers for obtaining upgraded low orientation precursor nylon fibers.

According to still an additional aspect of the present invention there is provided a fiber reinforced cementitious composite comprising a hardened cementitious matrix. The matrix includes staples of low orientation precursor nylon fibers characterized by an average birefringence value greater than 0.0350, but less than 0.0440, an average modulus greater than 10 gram/denier, but less than 25 gram/denier, an average tenacity greater than 2.5 gram/denier, but less than 3.4 gram/denier, and an average elongation capacity greater than 46%, but less than 100%.

According to another aspect of the present invention there is provided a method of manufacturing a reinforced hardened cementitious composite. The method comprises the steps of: (a) providing components of a cementitious matrix including a cementitious substance, water and staples of low orientation precursor nylon fibers being characterized by an average birefringence value greater than 0.0350, but less than 0.0440, an average modulus greater than 10 gram/denier, but less than 25 gram/denier, an average tenacity greater than 2.5 gram/denier, but less than 3.4 gram/denier, and an average elongation capacity greater than 46%, but less than 100%; (b) mixing the components until the fibers become well dispersed therein; and (c) hardening the matrix.

According to yet another aspect of the present invention there is provided a stack of fiber staples for reinforcement of a cementitious matrix such as concrete. The stack comprises melt spun fibers possessing a degree of molecular orientation characterized by birefringence values within the range of 0.0185–0.0440.

According to still another aspect of the present invention there is provided a method of producing staples of melt spun synthetic fibers suitable for reinforcement of a cementitious matrix. The method comprising the steps of: (a) melting and extruding a polymer through a spinneret to form drawn yarn fibers; (b) applying a spin finish to the drawn yarn fibers so as to obtain upgraded fibers characterized by a fiber-to-metal coefficient of friction measured on the corresponding continuous filament yarn, greater than 0.400 and a fiber-to-fiber coefficient of friction measured on the corresponding continuous filament yarns to less than 0.700; and (c) cutting the drawn yarn fibers into staples.

According to an additional aspect of the present invention there is provided a method of producing staples of melt spun synthetic fibers suitable for reinforcement of a cementitious matrix. The method comprises the steps of: (a) producing low-oriented yarn fibers, using a standard one step spinning process at a controlled speed, so as to control an orientation and mechanical properties of the low-oriented yarn fibers; (b) applying a spin finish to the low-oriented yarn fibers so as to obtain upgraded fibers characterized by a fiber-to-metal coefficient of friction measured on the corresponding continuous filament yarns greater than 0.400 and a fiber-to-fiber coefficient of friction measured on the corresponding continuous filament yarns to less than 0.700; (c) cutting the low oriented yarn fibers into staples.

According to yet an additional aspect of the present invention there is provided a method of producing staples of synthetic fibers suitable for reinforcement of a cementitious matrix, the method comprising the steps of: (a) providing existing synthetic fibers in a form of a continuous filament yarn or tow that has been treated and lubricated for an end use, (b) washing existing lubricants off of the existing synthetic fibers; (c) coating a surface of the existing synthetic fibers with a different lubricant, so as to obtain upgraded fibers characterized by a fiber-to-metal coefficient of friction measured on the corresponding continuous filament yarn, greater than 0.400 and a fiber-to-fiber coefficient of friction measured on the corresponding continuous filament yarns to less than 0.700; and (d) cutting the fibers into staples.

According to still an additional aspect of the present invention there is provided a synthetic fiber reinforced cementitious composite comprising a hardened cementitious matrix. The matrix includes staples of melt spun synthetic fibers, the fibers possessing a degree of molecular orientation characterized by birefringence values within the range of 0.0185–0.0440.

According to yet another additional aspect of the present invention there is provided a method of manufacturing a reinforced hardened cementitious composite. The method comprises the steps of: (a) providing components of a cementitious matrix including a cementitious substance, water and staples of melt spun synthetic fibers, the fibers possessing a degree of molecular orientation characterized by birefringence values within the range of 0.0185–0.0440; (b) mixing the components until the melt spun synthetic fibers become well dispersed therein; and (c) hardening the matrix.

According to further features in preferred embodiments of the invention described below, the fibers are characterized by an average tenacity of greater than 1.90 gram/denier and less than 3.20 gram/denier, an average elongation of greater than 30% and less than 90%, an average modulus of greater than 20 gram/denier and less than 60 gram/denier and an average sonic modulus of greater than 30 gram/denier and less than 88 gram/denier.

According to still further features in the described preferred embodiments the fibers are characterized by an average tenacity of greater than 2.0 gram/denier and less than 2.5 gram/denier, an average elongation of greater than 50% and less than 80%, an average modulus of greater than 23 gram/denier and less than 58 gram/denier and an average sonic modulus of greater than 33 gram/denier and less than 80 gram/denier.

According to still further features in the described preferred embodiments the fibers are characterized by an average tenacity of 2.36 gram/denier, an average elongation of 56%, an average modulus of 42 gram/denier and an average sonic modulus of 61 gram/denier.

According to still further features in the described preferred embodiments the fibers are characterized by an average cut length of greater than 2 mm and less than 50 mm and an average thickness of greater than 1 denier and less than 25 denier.

According to still further features in the described preferred embodiments the substance coating the fibers is applied as a spin finish.

According to still further features in the described preferred embodiments the substance coating the fibers is applied thereto as an aqueous solution of at least one substance selected from the group consisting of a nonionic emulsifier, a soap, an anionic surfactant and a silicone surfactant.

According to still further features in the described preferred embodiments the fibers are coated with a coating substance characterized by a low wetting tendency such that an average kinematic viscosity of the coating substance is greater than 100 cstokes and an average surface tension of the coating substance is greater than 60 dynes/cm.

According to still further features in the described preferred embodiments the coating substance is applied to the fibers as a spin finish.

According to still further features in the described preferred embodiments the fibers are further characterized by average specific surface properties of increased fiber to metal friction power consumption in excess of 20% and increased ring diameter in excess of 30% as measured by a RotorRing test using for comparison standard acrylic fibers of equivalent denier per filament and cut length values.

According to still further features in the described preferred embodiments the fibers are characterized by inducing superior plastic cracking inhibition in terms of percent cracking reduction as determined by a restraint ring method to an extent such that 400 grams of the fibers per cubic meter of standard concrete (0.017% by weight, or 0.033% by volume) are equivalent or better in plastic cracking inhibition, than any item selected from the group consisting of: (a) 1,000 grams of standard acrylic fibers per cubic meter of the standard concrete (0.0417% by weight or 0.0847% by volume); and (b) 900 grams polypropylene fibers per cubic meter of the standard concrete (0.0375% by weight or 0.100% by volume).

According to still further features in the described preferred embodiments the fibers are crimped.

According to still further features in the described preferred embodiments the acrylic polymer contains at least 85% acrylonitrile comonomer and at least one other comonomer selected from the group consisting of vinyl acetate, methyl acrylate, methyl methacrylate and sodium styrene sulfonate.

According to still further features in the described preferred embodiments the solvent is selected from the group consisting of dimethyl acetamide, dimethyl formamide, dimethyl sulfoxide, a thiocyanate and aqueous zinc chloride.

According to still further features in the described preferred embodiments the step of wet spinning is effected by substeps of (i) combining wet and dry fiber stretches so as to produce highly oriented spun fibers characterized by sonic modulus values greater than 150 gram/denier; (ii) applying a spin finish substance to the spun fibers to increase an average fiber-to-metal coefficient of friction to a level greater than 0.550, while simultaneously decreasing an average fiber-to-fiber coefficient of friction to a level less than 0.500; and (iii) annealing the spun fibers with a sufficient steam pressure so as to reduce an average sonic modulus of the spun fibers to less than 80 gram/denier.

According to still further features in the described preferred embodiments the method includes the additional step of crimping the fibers of the staples.

According to still further features in the described preferred embodiments the spin finish coating the fibers is derived from an aqueous solution of at least one substance selected from the group consisting of a nonionic emulsifier, a soap, an anionic surfactant and a silicone surfactant.

According to still further features in the described preferred embodiments the spin finish substance is characterized by a low wetting tendency, such that an average kinematic viscosity of the coating substance is greater than 100 cstokes and an average surface tension of the substance is greater than 60 dynes/cm.

According to still further features in the described preferred embodiments the fibers are impregnated with a chemical selected so as to obtain upgraded fibers characterized by increased chemical stability.

According to still further features in the described preferred embodiments the upgraded fibers acquire superior basic hydrolysis resistance.

According to still further features in the described preferred embodiments the chemical is selected from the group consisting of a salt that undergoes acid hydrolysis, benzene phosphonic acid, a manganese salt, a hindered phenol photo stabilizer, a hindered amine photo stabilizer, a phosphorous compound for ultraviolet stabilization, a phosphorous, amino and phenolic based antioxidants and copper iodide, copper acetate, potassium iodide, potassium bromide, zinc chloride and microsilica.

According to still further features in the described preferred embodiments the fibers include a nylon substance selected from the group consisting of nylon 6.6, nylon 6, copolymer nylon 6.6, 6, copolymer nylon 6.6, 6.TA and nylon 6.4.

According to still further features in the described preferred embodiments the stack comprises at least one member of the group consisting of melt spun polypropylene fibers with birefringence values within the range of 0.0185–0.0230 and melt spun nylon fibers with birefringence values within the range of: 0.0350–0.0440.

According to still further features in the described preferred embodiments the stack of fiber staples is further characterized by a modulus greater than 18 gram/denier but less than 35 gram/denier, a tenacity greater than 2.1 gram/denier but less than 3.7 gram/denier and an elongation capacity greater than 30% but less than 225%.

According to still further features in the described preferred embodiments the fibers are coated with a typical spin finish that increases the fiber-to-metal coefficient of friction to greater than 0.400 and decreases the fiber-to-fiber coefficient of friction measured on the corresponding continuous filament yarns to less than 0.700.

According to still further features in the described preferred embodiments the spin finish coating the fibers is derived from an aqueous solution of at least one substance selected from the group consisting of a nonionic emulsifier, a soap, an anionic surfactant and a silicone surfactant.

According to still further features in the described preferred embodiments the fibers are coated with a typical spin finish imparting lower interfiber cohesion by increasing kinematic viscosity to at least 150 cstokes and surface tension to at least 60 dynes/cm.

According to still further features in the described preferred embodiments the fibers possess specific surface properties characterized by the RotorRing test method evaluated relative to a standard melt spun fibers stack of fiber staple, such that power consumption for fibers opening, (f/m friction), is at least 20% greater than that of the standard and width of the spun ring is at least 30% greater than that of the standard.

According to still further features in the described preferred embodiments the fibers are characterized by superior plastic cracking inhibition capacity while maintaining higher slump values relative to standard fibers for concrete and cementitious system reinforcement such that 400 grams of fibers per cubic meter of concrete reduces the degree of cracking of a cementitious matrix in the concrete relative to a non-reinforced equivalent cementitious matrix by more than 80%, while reducing the slump of the reinforced concrete to less than 15%.

According to still further features in the described preferred embodiments the fibers are characterized by superior plastic cracking inhibition capacity while maintaining higher slump values relative to standard fibers for concrete and cementitious system reinforcement such that 400 grams of fibers per cubic meter of concrete reduces a degree of cracking of a cementitious matrix in the concrete relative to a non-reinforced cementitious matrix by more than 90%, while reducing the slump of the reinforced concrete to less than 9%.

According to still further features in the described preferred embodiments the drawn yarn fibers are polypropylene fibers and possess a degree of molecular orientation characterized by birefringence values within the range of 0.0185–0.0230.

According to still further features in the described preferred embodiments drawn yarn fibers are nylon fibers and possess a degree of molecular orientation characterized by birefringence values within the range of 0.0350–0.0440.

According to still further features in the described preferred embodiments the fibers are further coated with a typical spin finish that increases the fiber-to-metal coefficient of friction to greater than 0.400 and decrease the fiber-to-fiber coefficient of friction measured on the corresponding continuous filament yarns to less than 0.700.

The present invention successfully addresses the shortcomings of the presently known configurations by providing synthetic fibers with improved concrete reinforcing capabilities, methods for producing the fibers, cementitious composites containing the fibers and methods for producing the cementitious composites.

DESCRIPTION OF THE PREFERRED EMBODIMENTS

The present invention is of acrylic fibers, melt spun synthetic fibers and precursor low orientation nylon fibers which can be used as secondary reinforcement materials in cementitious composites. The present invention is also of a methods of producing the fibers and to cementitious composites containing the fibers. Specifically, the present invention can be used to improve the efficiency of short cut acrylic fibers for reinforcement of cementitious composites via adjustment of their friction and surface tension characteristics to obtain superior fibers dispersion in a cementitious matrix and greater reinforcement and crack arresting efficiency. Still specifically, the present invention can also be used to improve the efficiency with which short cut melt spun synthetic fibers reinforce cementitious composites by adjustment of their friction and surface tension characteristics to obtain superior fibers dispersion in the cementitious matrix and greater reinforcement and crack arresting efficiency. Further specifically, the present invention can also be used to upgrade precursor nylon fibers with low degrees of crystallinity and orientation, low tenacity and modulus and high elongation characteristics to render them suitable for use in secondary reinforcement of cementitious composites.

Before explaining at least one embodiment of the invention in detail, it is to be understood that the invention is not limited in its application to the details of construction and the arrangement of the components set forth in the following description. The invention is capable of other embodiments or of being practiced or carried out in various ways. Also, it is to be understood that the phraseology and terminology employed herein is for the purpose of description and should not be regarded as limiting.

Reference is first made to the following testing and characterization methods which are referred to through this disclosure and the accompanying claims.

Testing and Characterization Methods

Fiber Analysis

Tensile Properties of Single Filaments

A single fiber specimen under a specified low pretension is mounted between two sets of clamps and extended at a predetermined constant rate of 120%/min, until rupture. The forces and strains are recorded in stress strain curves according to ASTM D 76 standard specification for tensile testing machines for textile, which is incorporated herein by reference. Values for tenacity (stress at rupture), elongation at break and modulus at 5% elongation are extracted.

Sonic Modulus

The velocity of sound along the axis of each one hundred filament yarn sample is measured by a KLH Pulse Propagation Meter at a frequency of 10 kcps. The samples are stretched during testing. The sonic modulus (Esm in grams/denier) is calculated from the velocity of sound according to the formula $Esm=11.3\ V^2$ where V has the units of Kilometers/second.

Percent Oil on Yarn

The percentage of oil on a yarn is determined gravimetrically by extraction in a standard Soxhlet apparatus using petroleum ether, following the procedure for determination of textile finishes set forth in AATCC Monograph Number 3: Analytical methods for a textile laboratory, Pg. 137, 1968, which is incorporated herein by reference.

Fiber Surface Properties Characterization

Fiber-to-Metal Friction

Fiber-to-metal (f/m) friction is determined following the ASTM 3108 standard method, which is incorporated herein by reference, using a speed of 100 m/min and a chrome pin of 5 μm roughness and 12.7 mm diameter with a 180° wrap angle. The f/m coefficient of friction is extracted.

Fiber-to-Fiber Friction

Fiber-to-fiber (f/f) friction is determined following the ASTM 3412 standard method (second type; twist method), which is incorporated herein by reference, using a speed range of 2–20 mm/min, input tension of 10 grams, and a wrap angle of 3.5. 360 degrees. The f/f coefficient of friction is extracted.

Filament Cohesion Test

The filament cohesion test characterizes the interfiber cohesion forces in continuous filament yarns, is performed using the apparatus developed at the "Institute for Textiletechnik Denkendorf" in Germany for this purpose. Using this apparatus, the multifilament yarns are subjected to "ballooning" frictional stresses that open up the filaments. The number of opened filaments per distance unit perpendicular to the yarn axis is measured by means of photoelectric cells and reported in terms of the number filaments/meter. This is a relative test and samples are compared to absolute standards.

Staples Cohesion and Friction Test (RotorRing)

This test characterizes the interfiber cohesion as well as the Frictional especially fiber to metal (f/m) friction of cut fiber staples using the RotorRing testing system (Spinlab Special instruments Laboratory Inc., Knoxville, Tenn.). According to manufacturer's operation instructions, 1.0–2.5 grams of staple fibers are rotor spun into a uniform blended "ring" of fibers.

A measurement of the power required to open the fiber mass gives an indication of the total dynamic frictional forces operating on the fibers. When the testing parameters are adjusted (e.g. feeding mass 1.0 grams, rotoring speed 6,000 rpm) the results are indicative of fiber to metal friction. The size of the "ring" of fibers that is produced in the RotorRing process is indicative to the interfiber cohesion, with a smaller ring diameter indicating greater interactions. Results are reported as power units for the frictional force and as "ring" diameter (in length units) for the filament cohesion.

For testing the staple fibers of the invention, a special sample preparation procedure was developed that involves blending the staples with 2.5%–5.0% (by weight) of crimped viscose rayon staple fibers of length 60 mm, thickness 3.3 dtex, and 10 crimps per inch.

In order to increase the friction response of the fine fibers, a sand paper of known roughness was optionally inserted into the inside wall of the casing containing the opening roller of the RotorRing (Mogahzy et al., (1998) "Evaluating staple fibers processing properties" part I Textile Research Journal, 68(11): 835–840 and part II Textile Research Journal 68 (12): 907–912).

This is a relative test and results are compared to absolute standards.

Reinforced Cementitious Composite Analysis

Crack Reduction Potential:

The restraint ring test method (FCB Cement and Concrete Institute, Trodenheim, Norway, report, ISBN No. 82-4060-6) is employed to measure crack reduction potential. A fiber dose of 400 gram/meter$^3$ was used for the Acrylic fibers. The standard was polypropylene standard fibers at a dosage of 900 gram/meter$^3$. This reflects typical polypropylene standard fibers use in the construction industry and served as a control. Standard fibers employed for each test are defined hereinbelow.

Slump Test:

The slump test performed in accordance with ASTM C 143 test specifications. The self leveling (slumping) tendency of the fresh concrete mixture was measured by comparing the heights of the originally molded cone of concrete with that of the residual form of the same concrete allowed to slump freely. Cones were 300 mm high with a 200 mm lower base diameter and a 100 mm upper base diameter. A standard slump cone was used for the test following the ASTM procedure.

For purposes of this specification and the accompanying claims, all numerical values are approximate and are intended to include values which are between 90% and 110% of the given value.

Acrylic Fibers

In order to prepare acrylic fibers according to the present invention, fibers were spun on a research spinning machine especially assembled according to FIG. 1 according to McPeters and Paul (A. L. Mcpeters and D. R. Paul (1974) "Stress and Molecular Orientation Generated During Wet Spinning of Acrylic Fibers" Applied polymer symposia, 25, 159–178). The major components of the machine include a spinning pump (Zenith pumps, Sanford N.C.), draw and hot rolls (Neumag Machinen, GmbH, Germany), tow winder (Leezona, N.C.) and tow cutter (DM & E, N.C.).

A polymer—copolymer of acrylonitrile and 7.45% vinyl acetate with an average molecular weight of 118,000 was employed for this purpose. This standard acrylic dope was dissolved, 25% by weight, in dimethylacetamide (DMAC). The spinneret had 1,000 holes with a 3.5 mil capillary. The coagulation bath was 57% DMAC in water at 50 degrees C.

The jet velocity was controlled by the pump rate and capillary size and set at 20 feet/min. The jet stretch (V1/Vτ) at the coagulation bath was −1.68×. The cascade stretch (V2/V1) at the Orientation Draw Bath was within the range of 2.0–7.0×. The plastic stretch (V3/V2) at 165 degrees C. over steam heated godets was within the range of 3.5–1.0×. The jet speed is the emerging speed of the dope at the spinneret exit point. The jet speed depends on the throughput and spinneret capillary size. The Rollers speeds V1, V2, V3 are related to the rollers as indicated in FIG. 1 (Mc Peters and Paul, ibid.). (V1—wash rolls, V2—Drying Rolls and V3—final godets). The final godet speed was 100 feet/min. A Spin finish was applied in a finish bath after the plastic stretch. Spin finish uptake was controlled by the spin finish pump rate and the spin finish concentration, adjusted according to the spun tow denier and speed. A spin finish content of 0.5% to 0.6% (Over weight of fiber, as specified in each case hereinbelow) was applied.

Two different spin finishes were employed for acrylic yarn. The first was Tallopol SY 01 (Tal; Stockhausen, Krefeld Germany) which is a typical spin finish for spinning of acrylic staple yarns. The second was Standopol 1144+2074 (Stan; Henkel KGaA, Germany) which is a special combination for O.E. yarn spinning and Draw Texturizing of acrylic filament yarns.

Drying was achieved by 12 wraps of the tow running through steam heated rolls at 180 degrees C.

Fibers were annealed in a "free to relax" state in a saturated steam annealer (Ernst Benz, Switzerland) by a standard seven-cycle technique. Each cycle consisted of air evacuation, saturated steam pressurizing and maintaining pressure for 3 minutes at the required temperature and venting.

Test Results

The degree of combined stretch that is applied during wet spinning (jet stretch in coagulation bath, wet and cascade and dry plastic stretches) and the degree of steam annealing relaxation of the as spun fibers are well known to control the degree of orientation and corresponding mechanical properties (Mcpeters, A. L. and D. R. Paul, D. R. (1974) "Stress and molecular orientation during wet spinning of acrylic fibers" Applied Polymer Symposium No. 25, 159–178 and Gupta, B. S. et al., (1989) "The effect of hot wet draw ratio on the coefficient of friction of Acrylic yarns" J. App. Polym. Sci. 38:899–905).

Table 1 below demonstrates the effect of cascade stretch and annealing pressure on acrylic fibers, indicating routes to engineer products to the required modulus and shrinkage range that improves their cementitious systems reinforcement efficiency.

TABLE 1

Orientation, modulus and friction of As - Spun and annealed acrylic fibers

| Cascade Stretch X | Annealing Pressure (PSI) | Shrinkage % | Esm Sonic Modulus gram/den | ft** Orientation function | f/f Friction | Modulus* gram/denier |
|---|---|---|---|---|---|---|
| 2.0 | — | — | 98 | 0.6949 | 0.505 | 62 |
| 3.0 | — | — | 112 | 0.7316 | 0.541 | 68 |
| 4.0 | — | — | 123 | 0.7556 | 0.554 | 77 |
| 5.0 | — | — | 132 | 0.7725 | 0.549 | 81 |
| 6.0 | — | — | 139 | 0.7847 | 0.553 | 86 |
| 7.0 | — | — | 144 | 0.7918 | 0.558 | 92 |
| 2.0 | 7 × 60 | 23.9 | 73 | 0.5869 | 0.543 | 49 |
| 3.0 | 7 × 53 | 26.2 | 67 | 0.6089 | 0.552 | 50 |
| 5.0 | 7 × 44 | 30.0 | 70 | 0.6126 | 0.570 | 51 |
| 7.0 | 7 × 41 | 30.9 | 85 | 0.6487 | 0.579 | 54 |

*Modulus at 5% elongation.
**Total orientation function ft = 1 − Eu/Esm, where Esm is the sonic modulus of the fiber and Eu is the sonic modulus of unoriented fiber (estimated to be 30 gram/denier).

The un-annealed fiber results indicate a good control over the fiber orientation by the cascade stretch ratio and a corresponding increase of the modulus and the fiber-to-fiber friction values. The higher friction at higher orientation has been related to smoother surface morphologies associated with finer fibrillar structure development (Gupta, B. S. et al., (1989) "The effect of hot wet draw ratio on the coefficient of friction of Acrylic yarns" J. App. Polym. Sci. 38:899–905.)

The additional application of annealing shrinkage causes a substantial drop of the modulus values and further increases the friction, which is explained according with the Adhesion Theory of friction. The combination of smoother surfaces due to the higher draw-ratios and lower modulus due to the annealing shrinkage causes greater coefficients of friction and more effective fibers to cementitious composite interactions. These changes constitute the basis for the superiority of the fibers of the invention.

Table 2 demonstrates the above principle for obtaining fibers of greater crack reduction efficiency via a combination of high degree of stretching followed up by high annealing shrinkage. Spinning conditions, mechanical properties and crack reduction potential show typical parameters for the optimized fibers of the invention.

TABLE 2

Acrylic fibers for superior crack inhibition performance

| Cascade Str. X | Plastic Str. X | Anneal Temp. ° C. | Anneal Shrink % | Tenacity/ denier | Elong. % | Modulus gram/denier. | Sonic Modulus gram/denier | % Crack Reduction |
|---|---|---|---|---|---|---|---|---|
| 4.78 | 1.38 | 0 | 0 | 4.72 | 14 | 122 | 193 | 50 |
| 4.78 | 1.38 | 114 | 25 | 4.42 | 16 | 73 | 109 | 60 |
| 4.78 | 1.38 | 135 | 30 | 3.43 | 30 | 60 | 88 | 70 |
| 4.78 | 1.38 | 138 | 36 | 2.47 | 51 | 58 | 80 | 68 |
| 4.78 | 1.38 | 140 | 40 | 2.36 | 56 | 42 | 61 | 76 |
| 4.78 | 1.38 | 142 | 45 | 2.20 | 64 | 33 | 50 | 75 |
| 4.78 | 1.38 | 143 | 50 | 2.07 | 73 | 26 | 41 | 74 |
| 4.78 | 1.38 | 145 | 55 | 2.00 | 80 | 23 | 33 | 70 |
| 4.78 | 1.38 | 148 | 60 | 1.90 | 90 | 21 | 30 | 68 |
| 6.00 | 1.00 | 135 | 30 | 2.20 | 50 | 27 | 42 | 65 |

The results summarized in Table 2 indicate that combination of 4.78× cascade stretch and 1.38× plastic stretch is more effective than the cascade stretch alone and may therefore be applied favorably while implementing the present invention. Different combinations of plastic and cascade stretches along with annealing pressures and temperatures, as summarized in Table 2, are recommended for obtaining fiber's mechanical properties that yield the improved crack reduction capacity.

According to preferred embodiments of the invention the acrylic fibers are characterized by an average tenacity of greater than 1.90 gram/denier and less than 3.20 gram/denier, more preferably by an average tenacity of greater than 2.0 gram/denier and less than 2.5 gram/denier, and most preferably by an average tenacity of 2.36 gram/denier.

The fibers are preferably further characterized by an average elongation of greater than 30% and less than 90%, more preferably by an average elongation of greater than 50% and less than 80%, most preferably by an average elongation of 56%.

The fibers are still preferably further characterized by an average modulus of greater than 20 gram/denier and less than 60 gram/denier, more preferably an average modulus of greater than 23 gram/denier and less than 58 gram/denier and most preferably an average modulus of 42 gram/denier.

The fibers are yet preferably further characterized by an average sonic modulus of greater than 30 gram/denier and less than 88 gram/denier, more preferably an average sonic modulus of greater than 33 gram/denier and less than 80 gram/denier and most preferably an average sonic modulus of 61 gram/denier. Table 2 shows the correlation between these parameters and crack reduction.

According to preferred embodiments of the invention, a substance coating the fibers is applied as a spin finish. The substance coating the fibers is applied thereto as an aqueous solution of, for example, a nonionic emulsifier, a soap, an anionic surfactant and a silicone surfactant. The effect of spin finish coatings on friction and crack reduction potential of the acrylic fibers is demonstrated by the results summarized in Table 3 below.

TABLE 3

Spin finish effect on acrylic fibers

| Fiber No. | Cascade Str. X | Plastic Str. X | Shrink % | Finish Type | f/f Friction (1) | f/m Friction (2) | % Crack Reduct. |
|---|---|---|---|---|---|---|---|
| 10* | 6.0 | 1.0 | 30 | Tal | 0.58 | 0.387 | 65 |
| 10* | 6.0 | 1.0 | 30 | Stan | 0.48 | 0.450 | 73 |
| 5** | 4.78 | 1.38 | 40 | Tal | 0.53 | 0.491 | 76 |
| 5** | 4.78 | 1.38 | 40 | Stan | 0.41 | 0.560 | 83 |

Finish content 0.60%.
*Fiber No. 10: The 6.0 X cascade stretched fiber that was annealed at 135° C. (45 PSI) to 30% shrinkage.
**Fiber No. 5: The optimal plastic stretched fiber that was annealed at 140° C. (52 PSI) to 40% shrinkage.
(1) f/f friction was determined by a continuous filament test (ASTM 3412, type 2; twist method as detailed hereinabove) with a speed of 2 mm/min.
(2) f/m friction was determined by a continuous filament test (ASTM 3108 as detailed hereinabove using an input tension of 10 gram.

The results summarized in Table 3 demonstrate that the Standopol spin finish developed for higher fiber-to-metal friction and lower fiber-to-fiber friction, relative to the Tallopol finish, improves the crack reduction efficiency of the fibers by a significant amount in both plastic and cascade stretched fibers. Standopol spin finish is therefore recommended as one way to prepare acrylic fibers coated with a substance which increases the fiber-to-metal coefficient of friction to an average level greater than 0.550, while simultaneously decreasing the fiber-to-fiber coefficient of friction to an average level less than 0.500.

Spin finishes of the invention reduce also the inter fiber cohesive forces characterized by the filaments cohesion test as described hereinabove. The continuos filaments of fiber No. 5 spin finished with Tallopol and Standopol as described in Table 3, gave 0.002 filaments/meter and 0.300 filaments/meter, respectively. The inter fiber cohesive forces are affected by the wetting action of the spin finishes that is controlled by their kinematic viscosity and surface tension. The Standopol spin finish has a viscosity of 110 cstokes and a surface tension of 50 dynes/cm while the Tallopol spin finish has a viscosity of 40 cstokes and a surface tension of 28 dynes/cm. Therefore, it is not surprising that the relative results indicate significantly lower inter filament cohesion using the Standopol that is correlated with its higher viscosity and surface tension. This demonstrates that the fibers are coated with a coating substance characterized by a low wetting tendency such that an average kinematic viscosity of the coating substance is greater than 100 cstokes and an average surface tension of the coating substance is greater than 60 dynes/cm.

Friction properties of the cut staple fibers that are employed in preparation of cementitious composites according to the present invention were also evaluated by the RotorRing system as described hereinabove. A comparative RotorRing test of the present invention's Standopol finished No. 5 type of fiber (Table 3) was run using commercial Ricem MC acrylic staple fibers for concrete reinforcement as a standard. Staple parameters of both samples were 2.0 denier per filament, 12 mm cut—length, and flat fibers.

RotorRing test results show 26% more power consumption needed to open the Standopol relative to the Tallopol finished staple fibers in the RotorRing. This indicates significantly greater fiber-to-metal friction in the Standopol treated staples.

RotorRing test results also show 38% lower ring diameter in the Tallopol relative to the Standopol finished fibers. This indicates significantly lower interfiber cohesive forces in the Standopol vs. the Tallopol treated staples.

This means that the fibers are further characterized by average specific surface properties of increased power consumption in excess of 20% and increased ring diameter in excess of 30% as measured by a RotorRing test using for comparison to standard acrylic fibers (Tallopol coated fibers in this example) of equivalent denier per filament and cut length values.

The ability of acrylic fibers of the present invention to control plastic shrinkage cracking of concrete was also evaluated. Test methods were the restraint ring test and the slump test described hereinabove.

Standard Concrete composition was:

| | |
|---|---|
| Crashed aggregates | 800 (Kg/m³) |
| Fine crashed aggregates | 300 (Kg/m³) |
| Sand | 600 (Kg/m³) |
| Cement | 400 (Kg/m³) |
| Water | 223 (Kg/m³) |

To transform standard concrete into reinforced concrete, fibers were added as specified in Table 4 below.

TABLE 4

Fiber content of three mixes of concrete

| Mix No. | Fiber Type | Fiber length | Content (Kg/m³) |
|---|---|---|---|
| 1 | No fibers | N/A | N/A |
| 2 | Stan (Invention) | 12 mm | 0.4 |
| 3 | Ricem MC * | 12 mm | 1.0 |

* Ricem MC is a commercially produced Acrylic fiber especially designed for reduction of plastic shrinkage cracking in concrete.

TABLE 5

Summary of results of slump test and percent crack reduction for three mixes of concrete

| Mix No. | Slump mm | Total | Inside | Outside | Crack Reduction % |
|---|---|---|---|---|---|
| 1 | 175 | 1669.0 | 559.0 | 1100.0 | 0 |
| 2 | 163 | 50.0 | 23.0 | 60.0 | 93 |
| 3 | 153 | 333.0 | 121.0 | 210.0 | 80.0 |

The results summarized in Table 5 indicate that the fibers of the present invention are significantly superior to the commercial standard fibers (Ricem MC in this case). In fact they induced superior plastic cracking inhibition in terms of percent cracking reduction as determined by a restraint ring method to an extent such that 400 grams of the fibers per cubic meter of standard concrete (0.025% by weight, or 0.050% by volume) are equivalent or better in plastic cracking inhibition, than for example 1,000 grams of standard acrylic fibers per cubic meter of the standard concrete (0.0417% by weight or 0.0847% by volume or 900 grams of polypropylene fibers per cubic meter of the standard concrete (0.0375% by weight or 0.100% by volume).

The results summarized in Table 5 also indicate that the acrylic fibers of the present invention affect the slump of the concrete to a smaller extent. The 400 gram/meter of the fibers of the present invention improve the reinforced cementitious system's crack reduction % relative to the un-reinforced concrete, preferably by at least 80%, more preferably by at least 85% and most preferably by at least 93% or more. Similarly, 400 gram/meter$^3$ of the fibers of the present invention reduce the slump of the reinforced concrete relative to the un-reinforced concrete preferably by up to 14% and most preferably up to 7% or less.

A method of manufacturing staples of acrylic fibers for reinforcement of a cementitious matrix such as concrete constitutes an additional preferred embodiment of the present invention. The method comprises the steps of wet spinning a standard acrylic dope (as defined hereinabove) of at least 5%, but less than 35% (by weight) acrylic polymer, in a solvent to produce spun fibers and cutting the spun fibers into staples.

This method is applicable to, for example, an acrylic polymer containing at least 85% acrylonitrile comonomer and at least one other comonomer selected from the group consisting of vinyl acetate, methyl acrylate, methyl methacrylate and sodium styrene sulfonate. The solvent may be, for example, dimethyl acetamide, dimethyl formamide, dimethyl sulfoxide, a thiocyanate and aqueous zinc chloride.

In many cases the step of wet spinning is effected in three substeps. The first substep includes a combination of wet and dry fiber stretches designed to produce highly oriented spun fibers characterized by sonic modulus values greater than 150 gram/denier. The second substep includes applying a spin finish substance to the spun fibers to increase an average fiber-to-metal coefficient of friction to a level greater than 0.550, while simultaneously decreasing an average fiber-to-fiber coefficient of friction to a level less than 0.500. The third substep includes annealing the spun fibers with a sufficient steam pressure so as to reduce an average sonic modulus of the spun fibers to less than 80 gram/denier.

In some embodiments, the method includes the additional step of crimping the fibers of the staples.

The spin finish coating of the fibers may be derived from an aqueous solution of one or more substances such as, for example, nonionic emulsifiers, soaps, anionic surfactants and silicone surfactants. The spin finish substance is often characterized by a low wetting tendency, such that an average kinematic viscosity of the coating substance is greater than 100 cstokes and an average surface tension of the substance is greater than 60 dynes/cm.

A cementitious composite comprising a hardened cementitious matrix including staples of acrylic fibers for reinforcement constitutes an additional preferred embodiment of the invention. According to this embodiment, the fibers are coated with a substance which increases the fiber-to-metal coefficient of friction to an average level greater than 0.550, while simultaneously decreasing the fiber-to-fiber coefficient of friction to an average level less than 0.500 as described hereinabove. The fibers may be additionally treated as described hereinabove.

A method of manufacturing a reinforced hardened cementitious composite constitutes yet another preferred embodiment of the present invention. The method includes three steps. The first step includes providing components for forming a cementitious matrix. The components include a cementitious substance, water and staples of acrylic fibers for reinforcement. The second step includes mixing the components until the fibers become well dispersed therein. The third step includes hardening the matrix. The acrylic fibers are coated with a substance which increases the fiber-to-metal coefficient of friction to an average level greater than 0.550, while simultaneously decreasing the fiber-to-fiber coefficient of friction to an average level less than 0.500. The fibers may be additionally treated as described hereinabove.

Low Orientation Precursor Nylon Fibers

The present invention is, in part, a contradiction to the teachings of U.S. Pat. No. 6,001,476. In contrast to that patent, in the present invention, the nylon fibers that are upgraded and rendered suitable for use for reinforcement of cementitious composites are "precursors" for the textile and technical types of nylon fibers. Use of these precursors is not taught by U.S. Pat. No. 6,001,476 altogether. The precursor nylon fibers are intermediate products that usually undergo further drawing, texturizing and heat setting processes to achieve the required mechanical and textile properties of the final products. Elimination of these additional production steps is commercially desirable. The precursor nylon fibers are characterized by lower degrees of crystallinity and orientation, lower tenacity and modulus and higher elongation to break than textile nylon fibers. Table 6 below summarizes differences in some physical properties of precursor, textile and technical nylon fibers along with their different production conditions.

TABLE 6

Comparison between different nylon fiber types

| Parameter | Precursor | Textile | Technical |
|---|---|---|---|
| Thickness | 1–20 (4) denier | 1–15 (3) denier | 5–20 (7) denier |
| Birefringence | 0.035–0.044 (0.040) | 0.045–0.054 (0.050) | 0.055–0.070 (0.060) |
| Tenacity | 2.5–3.4 (3.0) gram/denier | 3.5–5.0 (4.0) gram/denier | 7.0–11.0 (8.0) gram/denier |

TABLE 6-continued

Comparison between different nylon fiber types

| Parameter | Precursor | Textile | Technical |
|---|---|---|---|
| Elongation | 46–100 (75) % | 21–45 (40) % | 10–20 (15) % |
| Modulus | 10–25 (10) gram/denier | 25–40 (35) gram/denier | 40–70 (55) gram/denier |
| Spinning Speed * (POY) | 3,000–4,500 m/min | 4,600–5,500 m/min | >5,500 m/min |
| Draw Ratio ** (Drawn) | 1.5–3.0 X | 3.1–4.0 X | 5.0–8.0 X |

\* One step spinning of 40–80 RV polymers.
\*\* Drawing of 40 RV polymer UD yarn that was spun at 750 m/min.

It is apparent that as the molecular orientation (indicated here by birefringence) of the fibers increases, the mechanical properties shift from the precursor to the textile and further to the technical types of yarns.

Therefore, this aspect of the present invention is embodied by a stack of fiber staples for reinforcement of a cementitious matrix such as concrete. The stack includes low orientation precursor nylon fibers characterized by an average birefringence value greater than 0.0350, but less than 0.0440, an average modulus greater than 10 gram/denier, but less than 25 gram/denier, an average tenacity greater than 2.5 gram/denier, but less than 3.4 gram/denier, and an average elongation capacity greater than 46%, but less than 100%.

In some cases the fibers are impregnated with a chemical selected so as to obtain upgraded fibers characterized by increased chemical stability. As a result, the upgraded fibers acquire superior basic hydrolysis resistance. The chemical may be, for example, a salt that undergoes acid hydrolysis, benzene phosphonic acid, a manganese salt, a hindered phenol photo stabilizer, a hindered amine photo stabilizer, a phosphorous compound for ultraviolet stabilization, a phosphorous, amino and phenolic based antioxidants and copper iodide, copper acetate, potassium iodide, potassium bromide, zinc chloride and microsilica.

The fibers may include, for example, a nylon substance selected from the group consisting of nylon 6.6, nylon 6, copolymer nylon 6.6, 6, copolymer nylon 6.6, 6.TA and nylon 6.4.

There are two typical industrial methods that are practiced to produce the different yarns. The first method is referred to as "one step spinning". In this method, variable speeds are used for the production of different types of yarns. "Undrawn yarns" are produced at low spinning speeds, "Partially Oriented Yarns" (POY or Precursor nylon fibers) are produced at high spinning speeds and "Fully Oriented Yarns" (FOY or technical nylon fibers) at ultra high spinning speeds. The second method involves two steps, the low spinning speed of "Undrawn yarns" followed by at least one drawing stage that increases the fibers orientation to the desired level. Table 7 below provides examples of the full range of spinning speeds that yield corresponding different fiber types, including the "Precursor" type, in one step of spinning.

TABLE 7

One step nylon 6.6 yarns spinning

| Modulus gram/denier | Elongation % | Tenacity gram/denier | Birefringence Δn | Spinning Speed m/min | Polymer RV |
|---|---|---|---|---|---|
| 4 | 287 | 1.15 | 0.021 | 750 | 40 |
| 4 | 234 | 1.35 | 0.024 | 1,000 | 40 |
| 6 | 125 | 2.35 | 0.030 | 2,000 | 40 |
| 10 | 78 | 3.21 | 0.039 | 3,000 | 40 |
| 15 | 60 | 3.70 | 0.043 | 4,000 | 40 |
| 35 | 43 | 4.50 | 0.045 | 5,000 | 40 |
| 5 | 175 | 1.53 | 0.027 | 750 | 80 |
| 5 | 172 | 1.84 | 0.032 | 1,000 | 80 |
| 8 | 117 | 2.75 | 0.035 | 2,000 | 80 |
| 10 | 104 | 3.35 | 0.041 | 3,000 | 80 |
| 12 | 92 | 3.44 | 0.043 | 4,000 | 80 |
| 48 | 19 | 6.13 | 0.048 | 5,000 | 80 |

Table 8 illustrates low speed "Undrawn" yarns of polymer RV values 40 and 80, spun at 750 and 1,000 m/min and drawn to the "precursor" fibers range

TABLE 8

Two steps spin - draw of nylon 6.6 yarns

| Polymer RV | Spinning Speed m/min | Draw Ratio X | Tenacity gram/denier | Elongation % | Modulus gram/denier |
|---|---|---|---|---|---|
| 40 | 750 | 2.75 | 3.40 | 64 | 16 |
| 80 | 750 | 1.90 | 3.40 | 72 | 14 |
| 40 | 1,000 | 2.32 | 3.40 | 62 | 17 |
| 80 | 1,000 | 1.81 | 3.80 | 57 | 19 |

The "Precursor nylon fibers", defined in Table 6 and obtained as described in Tables 7 and 8, were previously used mainly as feed yarns for the draw texturizing process for production of textured textile yarns, and for a sequential (continuous) or two step (separate) drawing processes to produce flat (uncrimped) textile or technical yarns. Prior to the present invention, these fibers were not used in final textile type of products, nor in concrete reinforcement, or in other applications, because of their relatively low strength and stability.

However, as will be explained hereinbelow, the lower orientation of the precursor nylon fibers relative to the textile fibers, and their corresponding lower modulus and bending rigidity, as well as greater elongation to break and extendibility, turned out to favorably affect their reinforcement efficiency with respect to concrete in contrast to prior art teachings.

In contrast to expectations, the more flexible fibers mix much more easily in a cementitious composite and conform more easily to different spaces between the aggregates of the composite. This results in improved mixing and distribution within the inter-aggregate spaces, which proved very beneficial to the fibers' cementitious matrix cracking inhibition capacity. The extendibility and toughness of the lower modulus nylon fibers allow for absorption of strain and impact energy by stretching under the plastic shrinkage and crack propagating stresses in the system, reinforcing the matrix more effectively.

According to the adhesion theory of friction, fibers of lower modulus generate greater friction with the cementitious systems aggregates due to the increased true contact area between the sliding surfaces. These frictional forces greatly affect the fiber distribution efficiency within the cementitious composite and increase also the efficiency of interfacial shear forces transfer to the fibers during crack arresting.

Nylon fibers of lower degrees of amorphous orientation absorb more water and cement active ingredients. Therefore, they swell to a greater extent and form tighter bonds with the surrounding matrix.

The flowability of fibers containing cementitious composites is reciprocally proportional to the fibers' stiffness. Therefore, cementitious composites reinforced by flexible fibers of lower modulus and higher elongation should possess flow properties superior to those of standard (commercially available) fibers for reinforcement of concrete. The workability of the composite is improved and is characterized by higher slump, better placeability, compatibility and finishability of the concrete, better flow through pipes, plasticization, hole filling, spreadability, adhesion to the wall and cohesiveness in mortars and other fine aggregate cementitious composites.

The precursor fibers that were produced according to Tables 7 and 8 were cut to 12 mm length and evaluated for plastic cracking reduction potential following FCB Cement and Concrete Institute, Trodenheim, Norway, report ISBN No. 82-4060-6 using a constant fibers dose of 400 grams/cubic meter of concrete.

Tables 9 and 10 report the crack reduction % relative to the POY and Drawn Yarns that were described in Tables 7 and 8 and were employed here as controls.

The results summarized in Table 10 indicate that adjustment of the draw ratios in a standard drawing operation of undrawn nylon yarns to obtain drawn yarns of low tenacity and modulus and high elongation, brings about fibers of improved plastic crack reduction potential.

Accordingly, the precursor nylon fibers of the present invention provide an additional range of fiber orientation and mechanical properties relative to that offered by the textile nylon yarns of U.S. Pat. No. 6,001,476. These fibers offer a significant reduction in the degree of plastic cracking in cementitious composites.

A method of upgrading low orientation precursor nylon fibers to render them more suitable for use in reinforcing a cementitious matrix is also embodied by this aspect of the present invention. The method includes three steps. The first step includes providing a stack of fiber staples including low orientation precursor nylon fibers characterized by an average birefringence value greater than 0.0350, but less than 0.0440, an average modulus greater than 10 gram/denier, but less than 25 gram/denier, an average tenacity greater than 2.5 gram/denier, but less than 3.4 gram/denier, and an average elongation capacity greater than 46%, but less than 100%. The second step includes impregnating the fibers with a chemical for obtaining impregnated nylon fibers. The chemical is selected so as to upgrade the fibers by increasing their chemical stability. The third step includes drying the low orientation precursor nylon fibers. This yields upgraded low orientation precursor nylon fibers.

TABLE 9

POY nylon 6.6 for superior crack inhibition performance

| Crack Reduction % | Modulus gram/denier | Elongation % | Tenacity gram/denier | Birefringence Δn | Spinning Speed m/min | Polymer RV |
|---|---|---|---|---|---|---|
| 25 | 4 | 287 | 1.15 | 0.021 | 750 | 40 |
| 50 | 4 | 234 | 1.35 | 0.024 | 1,000 | 40 |
| 73 | 6 | 125 | 2.35 | 0.030 | 2,000 | 40 |
| 85 | 10 | 78 | 3.21 | 0.039 | 3,000 | 40 |
| 81 | 15 | 60 | 3.70 | 0.043 | 4,000 | 40 |
| 75 | 35 | 43 | 4.50 | 0.045 | 5,000 | 40 |
| 55 | 5 | 175 | 1.53 | 0.027 | 750 | 80 |
| 65 | 5 | 172 | 1.84 | 0.032 | 1,000 | 80 |
| 75 | 8 | 117 | 2.75 | 0.035 | 2,000 | 80 |
| 88 | 10 | 104 | 3.35 | 0.041 | 3,000 | 80 |
| 85 | 12 | 92 | 3.44 | 0.043 | 4,000 | 80 |
| 60 | 48 | 19 | 6.13 | 0.048 | 5,000 | 80 |

Spin finish - 0.60% BK 2170 made by Henkel KGaA, Germany.

TABLE 10

Drawn nylon 6.6 yarns for superior crack inhibition performance

| Polymer RV | Spinning Speed m/min | Draw Ratio X | Tenacity gram/denier | Elongation % | Modulus gram/den. | Crack Reduction % |
|---|---|---|---|---|---|---|
| 40 | 750 | 2.75 | 3.40 | 64 | 16 | 80 |
| 80 | 750 | 1.90 | 3.40 | 72 | 14 | 83 |
| 40 | 1,000 | 2.32 | 3.40 | 62 | 17 | 78 |
| 80 | 1,000 | 1.81 | 3.80 | 57 | 19 | 73 |

Spin finish - 0.60% BK 2170 made by Henkel KGaA, Germany.

The results summarized in Table 9 indicate increased plastic cracking reduction capacity at low fiber orientation values. Excellent results are obtained with typical precursor fibers that were produced at spinning speeds between 3,000 and 4,500 m/min.

This aspect of the present invention is further embodied by a fiber reinforced cementitious composite comprising a hardened cementitious matrix including staples of low orientation precursor nylon fibers. The fibers are characterized by an average birefringence value greater than 0.350, but less than 0.0440, an average modulus greater than 10 gram/denier, but less than 25 gram/denier, an average tenacity greater than 2.5 gram/denier, but less than 3.4 gram/denier, and an average elongation capacity greater than 46%, but less than 100%.

A method of manufacturing a reinforced hardened cementitious composite is also embodied by this aspect of the invention. The method includes three steps. The first step includes providing components of a cementitious matrix including a cementitious substance, water and staples of low orientation precursor nylon fibers being characterized by an average birefringence value greater than 0.0350, but less than 0.0440, an average modulus greater than 10 gram/denier, but less than 25 gram/denier, an average tenacity greater than 2.5 gram/denier, but less than 3.4 gram/denier, and an average elongation capacity greater than 46%, but less than 100%. The second step includes mixing the components until the fibers become well dispersed. The third step includes hardening the matrix.

Melt Spun Fibers

The process of melt spinning may be applied to a wide range of polymeric fibers. Experimental data using polypropylene is presented here as a non-limiting example. Spinning conditions, orientation, mechanical properties and Crack Reduction potential of POY type of polypropylene fibers are given in Table 11

TABLE 11

POY polypropylene for superior crack inhibition performance

| Spinning Speed m/min | Birefringence Δn | Tenacity gram/denier | Elongation % | Modulus gram/denier | Crack Reduction % |
|---|---|---|---|---|---|
| 750 | 0.0125 | 1.3 | 550 | 10 | 15 |
| 1,000 | 0.0145 | 1.7 | 350 | 14 | 40 |
| 2,000 | 0.0185 | 2.1 | 225 | 18 | 50 |
| 3,000 | 0.0210 | 2.7 | 125 | 22 | 65 |
| 4,000 | 0.0225 | 3.0 | 50 | 27 | 69 |
| 5,000 | 0.0230 | 3.7 | 30 | 30 | 65 |
| 6,000 | 0.0235 | 5.2 | 10 | 48 | 60 |

In this example, the polymer was isotactic polypropylene of melting point 160° C. and melt flow index of 23.0 (gram/10 min.). The polymer was melted in an extruder and subsequently spun on a melt spinning line. Melt temperature was 280° C. and a Spinneret of 34 capillaries of diameter 0.300 mm was employed. The quench zone was 20° C. with a 1 ft/min airflow. Convergence distance was 72". Spin finish (0.6% Laviron NSO) application was through a kiss roll to 0.5% over weight of fiber. Polymer throughput was designed to have final spun yarn denier of 102 (3.0 denier per filament) at all spinning speeds.

These results point out the trend of improved crack reduction efficiency for fibers of lower levels of orientation, lower tenacity and modulus and greater elongation values while maintaining the tenacity above a minimum value required to reinforce the matrix. Accordingly, parameters for spinning and resultant properties of polypropylene fibers of the invention are recommended as follows.

Preferred embodiments according to this aspect of the present invention include a stack of fiber staples for reinforcement of a cementitious matrix such as concrete. The stack comprises melt spun fibers possessing a degree of molecular orientation characterized by birefringence values within the range of 0.0185–0.0440. The stack includes, for example, melt spun polypropylene fibers with birefringence values within the range of 0.0185–0.0230 or melt spun nylon fibers with birefringence values within the range of: 0.0350–0.0440. The stack of fiber staples may be further characterized by a modulus greater than 18 gram/denier but less than 35 gram/denier, more preferably greater than 22.00 gram/denier but less than 27.00 gram/denier and most preferably 27 gram/denier, and a tenacity greater than 2.1 gram/denier but less than 3.7 gram/denier, more preferably greater than gram/denier 2.70 but less than 3.00 gram/denier and most preferably 3.00 gram/denier, and an elongation capacity greater than 30% but less than 225%, more preferably greater than 50% but less than 125% and most preferably 90%.

According to preferred embodiments the drawn yarn fibers are polypropylene fibers and possess a degree of molecular orientation characterized by birefringence values within the range of 0.0185–0.0230. According to other preferred embodiments the drawn yarn fibers are nylon fibers and possess a degree of molecular orientation characterized by birefringence values within the range of 0.0350–0.0440.

Drawn polypropylene fibers suitable for use as part of the present invention can also be obtained via low speed spinning and sequential drawing, either continuously or in two separate operations. Table 12 summarizes the spinning conditions, orientation, mechanical properties and crack reduction potential of the drawn polypropylene fibers.

TABLE 12

Drawn polypropylene yarns for superior crack inhibition performance

| Spinning Speed m/min | Draw Ratio X | Tenacity gram/denier | Elongation % | Modulus gram/denier | Crack Reduction % |
|---|---|---|---|---|---|
| 787 | 2.0 | 2.00 | 248 | 18 | 40 |
| 787 | 2.5 | 2.80 | 126 | 20 | 65 |
| 787 | 3.0 | 3.35 | 55 | 22 | 73 |
| 787 | 3.5 | 3.80 | 30 | 27 | 68 |
| 787 | 4.0 | 4.60 | 15 | 43 | 60 |

Isotactic polypropylene of melting point 160 degrees C. and melt flow index of 23.0 (gram/10 min) was employed. This polymer was melted in an extruder and subsequently spun on the melt spinning line described hereinabove with a Melt temperature of 280 degrees C. A spinneret with 34 capillaries of diameter 0.300 mm was employed. The quench zone 35" at 20 degrees C. with a 1 ft/min airflow. The convergence distance was 72". Polymer throughput was designed to produce a final drawn fiber of 3.0 denier per filament (22 μm diameter). The spun yarn was drawn in a boiling water orientation draw bath and subsequently relaxed. The draw ratio was controlled by the rolls speeds ratio V2/V1. The relaxation was performed over steam heated rolls at 150 degrees C. A constant relaxation of 12% was applied by keeping the rolls speed ratio V3/V2=0.85. The final V3 draw roll speed was 60 m/min. Lubricating finish was applied in a finish bath after the relaxation stage. This finish is designed to wet the fibers and modify their surface properties to allow ready dispersion in the concrete. A typical Wetting agent (i.e., Laviron NSO made by Henkel KGaA, Germany) at a level of 0.6% (over weight of fibers) was applied by controlling the finish pump rate and finish concentration. Final drying was achieved by 12 wraps of the drawn yarn on a pair of steam heated rolls at 150 degrees C.

The results summarized in Table 12 indicate that adjustments of the draw ratios in a standard drawing operation of typical As-spun polypropylene to obtain drawn yarns of lower tenacity and modulus and higher elongation than the standard technical fibers, bring about fibers of improved concrete crack reduction potential.

While Table 12 presents a detailed set of production parameters, this aspect of the present invention includes three general methods for producing staples of melt spun synthetic fibers suitable for reinforcement of a cementitious matrix.

The first method for producing staples of melt spun synthetic fibers suitable for reinforcement of a cementitious matrix according to the present invention is a three-step method. The first step includes melting and extruding a polymer through a spinneret to form drawn yarn fibers. The second step includes applying a spin finish to the drawn yarn fibers so as to obtain upgraded fibers characterized by a fiber-to-metal coefficient of friction measured on the corresponding continuous filament yarn, greater than 0.400 and a fiber-to-fiber coefficient of friction measured on the corresponding continuous filament yarns to less than 0.700. The third step includes cutting the drawn yarn fibers into staples.

The second method for producing staples of melt spun synthetic fibers suitable for reinforcement of a cementitious matrix according to the present invention is also a three-step method. The first step includes producing low oriented yarn fibers, using a standard one step spinning process at a controlled speed, so as to control an orientation and mechanical properties of the low oriented yarn fibers. The second step includes applying a spin finish to the low oriented yarn fibers so as to obtain upgraded fibers characterized by a fiber-to-metal coefficient of friction measured on the corresponding continuous filament yarn, greater than 0.400 and a fiber-to-fiber coefficient of friction measured on the corresponding continuous filament yarns to less than 0.700. The third step includes cutting the low oriented yarn fibers into staples.

The third method for producing staples of melt spun synthetic fibers suitable for reinforcement of a cementitious matrix according to the present invention is a four-step method. The first step includes providing existing synthetic fibers in a form of a continuous filament yarn or tow that has been treated and lubricated for an end use. The second step includes washing existing lubricants off of the existing synthetic fibers. The third step includes coating a surface of the existing synthetic fibers with a different lubricant, so as to obtain upgraded fibers characterized by a fiber-to-metal coefficient of friction measured on the corresponding continuous filament yarn, greater than 0.400 and a fiber-to-fiber coefficient of friction measured on the corresponding continuous filament yarns to less than 0.700. The fourth step includes cutting the fibers into staples.

In order to demonstrate the effect of surface properties on the reinforcement efficiency of polypropylene fibers, in addition to the wetting effect of the spin finishes, optimal POY and Drawn fibers from the previous examples were treated with a commercially available wetting finish (Laviron NSO, Henkel KGaA, Germany) and with an especially modified wetting agent that imparts higher fiber-to-metal friction properties, being used for draw texturizing of polypropylene POY (BKM). Finish content on yarns was maintained at 0.6% (over weight of fibers). Table 13 compares the friction and crack reduction potential imparted by the two types of finish.

TABLE 13

Effect of spin finish on polypropylene yarns

| yarn type | Finish type | f/f Friction Coefficient | f/m Friction Coefficient | Crack Reduction % |
|---|---|---|---|---|
| Drawn | Laviron | 0.650 | 0.250 | 73 |
| Drawn | BKM | 0.530 | 0.500 | 85 |
| POY | Laviron | 0.630 | 0.230 | 69 |
| POY | BKM | 0.545 | 0.480 | 83 |

Drawn Spinning Speed = 787 m/min, Draw Ratio = 3.0

The POY Spinning Speed was 4,000 m/min. The Laviron Standard Spin finish is for water dispersion of polypropylene cut fibers. The BKM Spin finish is for both water dispersion of cut polypropylene fibers and for draw texturizing of polypropylene fibers.

Friction properties were measured on continuous filaments as described hereinabove. The results indicate the effect of spin finish on fiber-to-metal and fiber-to-fiber coefficients of friction in correlation with the crack reduction efficiency of the treated fibers. In summary, increasing the fiber-to-metal friction, while reducing the fiber-to-fiber friction values below a threshold limit, significantly improves the crack reduction efficiency of the fibers.

While commercially available spin finishes are disclosed here as examples, any draw texturizing spin finish that increases the fiber-to-metal coefficient of friction to greater than 0.400, more preferably greater than 0.450, most preferably greater than 0.500 and decreases the fiber-to-fiber coefficient of friction measured on the corresponding continuous filament yarns to less than 0.700, more preferably less than 0.600, most preferably less than 0.530 is suitable for use as part of the present invention. The spin finish coating the fibers may be derived from an aqueous solution of, for example, a nonionic emulsifier, a soap, an anionic surfactant or a silicone surfactant. The spin finish, when applied, will typically impart lower interfiber cohesion by increasing kinematic viscosity to at least 150 cstokes and surface tension to at least 60 dynes/cm.

Cut staple fibers of the invention were applied directly to cementitious composites and characterized for surface properties by the RotorRing test described hereinabove. A comparative test was performed on polypropylene staple cut fibers of the POY filaments that were spun at 4,000 m/min and surface treated with BKM special draw texturizing spin finish as described in the Tables 11 and 13. Comparison was to standard polypropylene fibers for reinforcement of concrete against plastic cracking (modulus=51 grams/denier, tenacity=5.2 grams/denier, elongation=10%, round cross section, conventionally spin finish treated to facilitate dispersion in the cementitious system (e.g. Fibermesh stealth fibers type 6922)). Both staple fibers were flat (uncrimped), 3.0 denier per filament and 19 mm long.

The BKM fibers possess specific surface properties characterized by the RotorRing test method evaluated relative to a standard melt spun fibers stack of fiber staples (defined hereinabove), such that power consumption for fibers opening (f/m friction) is at least 20% greater than that of the standard and width of the spun ring (interfilament cohesiveness) is at least 30% (40% in this experiment) greater than that of the standard. These results indicate significantly lower fiber to fiber cohesive forces in the BKM finished staple fibers of the invention.

Test methods for cracking resistance were the restraint ring test and the slump test methods described hereinabove.

Standard concrete mix proportions (Kg/m³):

| | |
|---|---|
| Crushed aggregates | 800 |
| Fine crushed aggregates | 300 |
| Sand | 600 |
| Cement | 400 |
| Water | 223 |

Experimental concrete mixtures include Fibers as specified in Table 14. Three mixes were prepared and tested for slump and restraint ring plastic shrinkage cracking.

TABLE 14

Experimental concrete mix compositions

| Mix No. | Fiber Type | Fiber length | Content (Kg/m³) |
|---|---|---|---|
| 1 | No fibers | | |
| 2 | BKM (Invention) | 19 mm | 0.4 |
| 3 | 6922* | 19 mm | 0.9 |

*6922 - "Stealth 6922" commercial polypropylene fibers produced by Fibermesh for reduction of plastic shrinkage cracking in cementitious systems.

TABLE 15

Results of slump and crack reduction tests

| Mix No. | Slump mm | Total | Inside | Outside | Crack Reduction % |
|---|---|---|---|---|---|
| 1 | 175 | 1669.0 | 559.0 | 1100.0 | 0 |
| 2 | 160 | 83.0 | 17.0 | 66.0 | 95.0 |
| 3 | 150 | 333.0 | 121.0 | 210.0 | 80.0 |

Table 14 indicates that the fibers of the invention are superior to the commercial standard fibers in terms of plastic crack reduction and that they affect the slump of the concrete to a smaller extent.

The fibers are characterized by superior plastic cracking inhibition capacity while maintaining higher slump values relative to standard fibers for concrete and cementitious system reinforcement such that 400 grams of fibers per cubic meter of concrete reduces the degree of cracking of a cementitious matrix in the concrete relative to a non-reinforced equivalent cementitious matrix by more than 80%, while reducing the slump of the reinforced concrete to less than 15%.

In some preferred embodiments fibers are characterized by superior plastic cracking inhibition capacity while maintaining higher slump values relative to standard fibers for concrete and cementitious system reinforcement such that 400 grams of fibers per cubic meter of concrete reduces a degree of cracking of a cementitious matrix in the concrete relative to a non-reinforced cementitious matrix by more than 90%, while reducing the slump of the reinforced concrete to less than 9%.

According to additional preferred embodiments a synthetic fiber reinforced cementitious composite comprising a hardened cementitious matrix is provided. The matrix includes staples of melt spun synthetic fibers, the fibers possessing a degree of molecular orientation characterized by birefringence values within the range of 0.0185–0.0440.

According to additional preferred embodiments a method of manufacturing a reinforced hardened cementitious composite is disclosed. The method comprises three steps. The first step includes providing components of a cementitious matrix including a cementitious substance, water and staples of melt spun synthetic fibers, the fibers possessing a degree of molecular orientation characterized by birefringence values within the range of 0.0185–0.0440. The second step includes mixing the components until the melt spun synthetic fibers become well dispersed therein. The third step includes hardening the matrix.

With regard to acrylic fibers, precursor nylon fibers and melt spun synthetic fibers of the present invention, the fibers are typically characterized by an average cut length of greater than 2 mm and less than 50 mm and an average thickness of greater than 1 denier and less than 25 denier although other lengths and thicknesses are within the scope of the invention.

With regard to acrylic fibers, precursor nylon fibers and melt spun synthetic fibers of the present invention, the fibers are crimped in some instances and straight in other instances.

CONCLUDING REMARKS

The fibers of the present invention are substantially different from prior art concrete and cementitious systems reinforcing fibers because they possess unique surface and mechanical properties as a result of either surface coatings or reduced modulus. The fibers of the present invention offer faster and easier mixing of the fibers in both the wet cementitious system and in dry cementitious premix systems. The fibers of the present invention also offer better dispersion and compatibility of the fibers in concretes, mortars and other fine aggregates cementitious systems. Hardened cementitious composites prepared using the fibers of the present invention are characterized by a lower degree of plastic cracking at lower fiber concentrations, a lower degree of delayed cracking, a lower degree of plastic and delayed shrinkage, greater impact resistance, better flexural strength at equivalent doses of fibers, and greater extendibility and higher strain levels before cracking. In addition, higher contents of fibers in the cementitious systems are achievable more easily, improving the crack arresting, toughness and flexural strength of the reinforced systems.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A stack of fiber staples for reinforcement of a cementitious matrix, where the stack comprises at least one member of the group consisting of melt spun polypropylene fibers with birefringence values within the range of 0.01850–0.0230 and melt spun nylon fibers with birefringence values within the range of 0.0350–0.0480, wherein the fibers are further characterized by a modulus greater 10 gram/denier but less than 35 gram/denier, a tenacity greater than 2.1 gram/denier but less than 3.7 gram/denier and an elongation capacity greater than 30% but less than 225%.

2. The stack of fiber staples of claim 1, wherein the stack comprises melt spun nylon fibers with birefringence values within the range of 0.0350–0.0440.

3. The stack of claim 2 additionally comprising melt spun polypropylene fibers with birefringence values within the range of 0.01850–0.0230.

4. A stack of fiber staples for reinforcement of a cementitious matrix, comprising melt spun polypropylene fibers with birefringence values within the range of 0.01850–0.0230, and melt spun nylon fibers.

5. A cementitious matrix comprising a cementitious substance and a fiber staple reinforcement that comprises at least one member of the group consisting of melt spun polypropylene fibers with birefringence values within the range of 0.01850–0.0230 and melt spun nylon fibers with birefringence values within the range of 0.0350–0.0480 and wherein the fibers are further characterized by a modulus greater than 10 gram/denier but less than 35 gram/denier, a tenacity greater than 2.1 gram/denier but less than 3.7 gram/denier and an elongation capacity greater than 30% but less than 225%.

* * * * *